United States Patent
Martino et al.

(10) Patent No.: US 11,120,135 B2
(45) Date of Patent: Sep. 14, 2021

(54) UPDATING SECURITY INFORMATION ON MULTIPLE COMPUTING MACHINES

(71) Applicant: INTERNATIONAL BUSINESS MACHINES CORPORATION, Armonk, NY (US)

(72) Inventors: Marco Martino, Rome (IT); Giuseppe Ciano, Rome (IT); Roberto Giordani, Rome (IT); Gianluca Bernardini, Rome (IT); Salvatore D'Angelo, Fiumicino (IT); Valeria Perticara', Rome (IT); Roberto Piras, Rome (IT); Angelo Albanese, Rome (IT)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/145,260

(22) Filed: Sep. 28, 2018

(65) Prior Publication Data

US 2020/0104500 A1    Apr. 2, 2020

(51) Int. Cl.
| | |
|---|---|
| *G06F 21/57* | (2013.01) |
| *G06F 8/65* | (2018.01) |
| *G06F 21/62* | (2013.01) |
| *H04L 29/06* | (2006.01) |

(52) U.S. Cl.
CPC ............... *G06F 21/57* (2013.01); *G06F 8/65* (2013.01); *G06F 21/6209* (2013.01); *H04L 63/20* (2013.01)

(58) Field of Classification Search
CPC ........ G06F 21/57; G06F 8/65; G06F 21/6209; G06F 21/577; H04L 63/20
See application file for complete search history.

(56) References Cited

U.S. PATENT DOCUMENTS

| | | | |
|---|---|---|---|
| 7,607,164 B2 | 10/2009 | Vasishth et al. | |
| 8,266,674 B2 | 9/2012 | Huang et al. | |
| 8,429,642 B1* | 4/2013 | Cheng | H04L 67/34 |
| | | | 717/173 |
| 8,516,474 B2* | 8/2013 | Lamba | H04L 67/34 |
| | | | 717/172 |
| 8,745,715 B2 | 6/2014 | Lindholm et al. | |
| 9,420,065 B2* | 8/2016 | Mayo | H04L 67/34 |
| 9,648,012 B1* | 5/2017 | Machani | H04L 63/061 |
| 9,658,841 B2* | 5/2017 | Krishna | G06F 8/65 |

(Continued)

OTHER PUBLICATIONS

Zhao, Hang, "Security Policy Definition and Enforcement in Distributed Systems", Columbia University, © 2012, 163 pages.

(Continued)

*Primary Examiner* — James R Turchen

(74) *Attorney, Agent, or Firm* — David Spalding

(57) ABSTRACT

A computing system comprises a plurality of computing machines, each computing machine storing security information corresponding with the respective computing machine. Embodiments are directed to receiving an update request by a current computing machine for updating corresponding security information, updating the corresponding security information, determining other computing machines coupled with the current computing machine, and submitting, by the current computing machine, a further update request to each other computing machine that is coupled with the current computing machine.

13 Claims, 6 Drawing Sheets

(56) References Cited

U.S. PATENT DOCUMENTS

| | | | |
|---|---|---|---|
| 2003/0061520 A1 | 3/2003 | Zellers et al. | |
| 2007/0136297 A1* | 6/2007 | Choe | G06F 21/57 |
| 2008/0104411 A1 | 5/2008 | Agrawal et al. | |
| 2008/0209414 A1* | 8/2008 | Stein | H04L 67/34 |
| | | | 717/173 |
| 2011/0106886 A1* | 5/2011 | Nolterieke | G06F 8/65 |
| | | | 709/204 |
| 2012/0167169 A1* | 6/2012 | Ge | H04L 9/321 |
| | | | 726/2 |
| 2013/0326494 A1* | 12/2013 | Nunez | H04L 67/34 |
| | | | 717/172 |
| 2013/0347059 A1* | 12/2013 | Fong | H04L 12/287 |
| | | | 726/1 |
| 2015/0082032 A1* | 3/2015 | Bruce | H04L 63/083 |
| | | | 713/168 |
| 2015/0200781 A1 | 7/2015 | Tu et al. | |
| 2018/0063123 A1* | 3/2018 | Tempel | G06F 21/44 |
| 2020/0107186 A1* | 4/2020 | Park | G06F 8/65 |

OTHER PUBLICATIONS

"Managing password changes for users", IBM Knowledge Center, Printed Feb. 20, 2018, 3 pages, <https://www.ibm.com/support/knowledgecenter/en/SSPHQG_7.1.0/com.ibm.powerha.admngd/ha_admin_manage_password_change.htm>.

\* cited by examiner

UPDATING SECURITY INFORMATION ON MULTIPLE COMPUTING MACHINES

BACKGROUND

The present disclosure relates to the information technology field. More specifically, this disclosure relates to the updating of security information.

Security is a critical issue in computing systems. For this purpose, different security measures may be implemented to protect the computing systems from damages that may be caused thereto, either intentionally or accidentally. For example, access control measures are aimed at restricting access to any computing system selectively. In this way, it is possible to ensure (with a certain degree of confidence) that only authorized users may access the computing system and are granted desired privileges to operate thereon; at the same time, this prevents (or at least substantially hinders) unauthorized users from accessing the computing system, thereby avoiding (or at least reducing) the risk that they might perform undesired (and generally dangerous) activities on the computing system. For example, authentication techniques are commonly used to confirm the identity of the users attempting to access the computing system by means of credentials that should be possessed by the authorized users to prove their identity.

BRIEF SUMMARY

A simplified summary of the present disclosure is herein presented in order to provide a basic understanding thereof; however, the sole purpose of this summary is to introduce some concepts of the disclosure in a simplified form as a prelude to the more detailed description that follows, and it is not to be interpreted as an identification of its key elements nor as a delineation of its scope.

Particularly, an aspect provides a method for updating security information in a computing system comprising a plurality of computing machines. For each computing machine, the method comprises receiving an update request, updating the corresponding security information and submitting a further update request to each other computing machine that is coupled with the computing machine.

A further aspect provides a computer program for implementing the method.

A further aspect provide a computer program product for implementing the method.

A further aspect provides a corresponding system.

A further aspect provides a corresponding computing machine.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

Embodiments of the present invention will now be described in detail with reference to the accompanying Figures.

Authentication techniques are commonly used to confirm the identity of the users attempting to access a computing system by means of credentials that should be possessed by the authorized users to prove their identity. Generally, security techniques are based on corresponding security information. For example, in authentication techniques, the credentials of the authorized users may be (secret) authentication information that is supposed to be known to the authorized users only (such as corresponding passwords).

To increase security, the security information may be updated continually. This makes it more difficult for attackers to acquire the security information illicitly; in any case, should the attackers manage to acquire the security information, the continual updating limits a time window for any harmful use thereof. For example, in the case of authentication techniques, the users may be required to change their passwords periodically. Moreover, security policies may be implemented that change over time; this makes it possible to adapt the level of security to contingent needs and to cope with evolving threats. For example, in the case of authentication techniques different rules may be defined for the passwords (for example, their minimum length, types of characters).

All of the above is especially important in computing systems that are not isolated, for example, when they need to interact with the external world via the Internet (since this exposes the computing systems to the risk of attacks from the outside). However, the activities that may be implemented to keep the security information up-to-date may be mainly manual and time consuming. Moreover, it may be difficult to ensure that the security information is consistently updated timely. For example, with reference to the authentication techniques, the passwords may expire if they are not changed within corresponding expiration times.

All of the above is exacerbated in computing systems comprising multiple computing machines (for example, a network of computers of a cloud provider). Indeed, in this case the same operations are to be repeated several times on the different computing machines to update the security information corresponding with the different computing machines.

The time that is required to update the security information may cause a (relatively long) downtime of a corresponding service that is provided by the computing system.

Moreover, any missing update of the security information may prevent the correct execution of corresponding processes. For example, when the password of a computing machine is expired, an invocation of a function on this computing machine (by another computing machine) may fail.

With reference in particular to FIG. 1A-FIG. 1D, an example is shown of application of the solution according to an embodiment of the present disclosure.

Figure 1A:
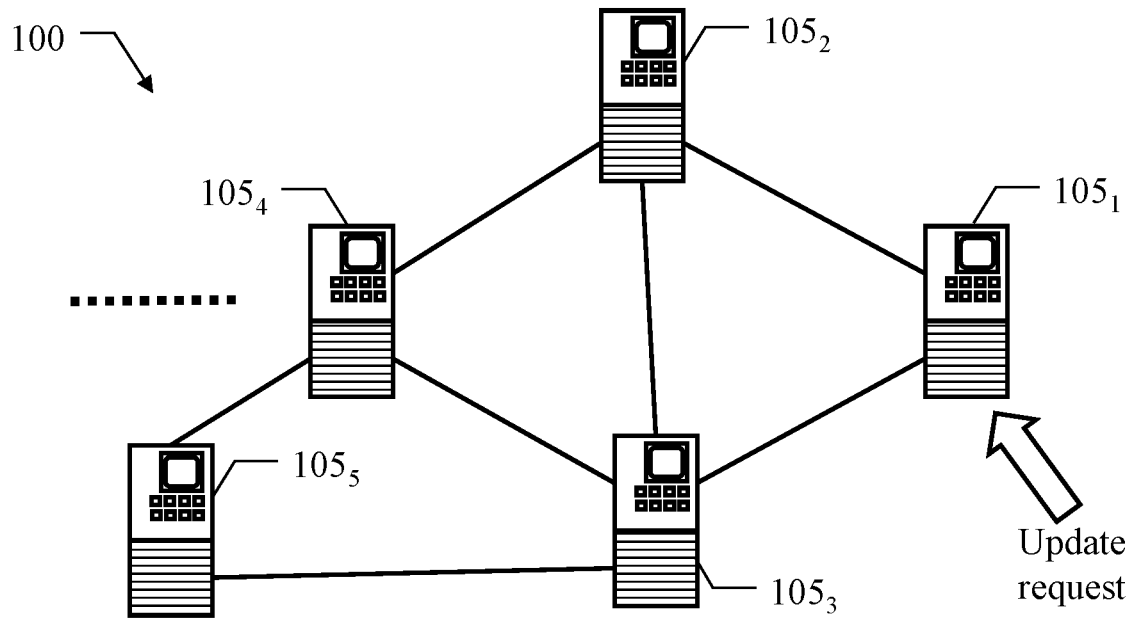
FIG. 1A-FIG. 1D show an example of an application of the solution according to an embodiment of the present disclosure.

Starting from FIG. 1A, a computing system 100 comprises a plurality of computing machines 105$i$, with i=1 . . . N such as N=10-500 (for example, a network of computers of a cloud provider). Each computing machine 105$i$ has corresponding security information; for example, a password is stored in each computing machine 105$i$ to authenticate its (authorized) user for granting access thereto. A request for updating the security information of the computing system 100 is received by a first computing machine 105$_1$, selected in any way (for example, when an expiration time of the passwords of the computing system 100 is approaching). The first computing machine 105$_1$ may be referred to as a "current" computing machine.

Figure 1B:
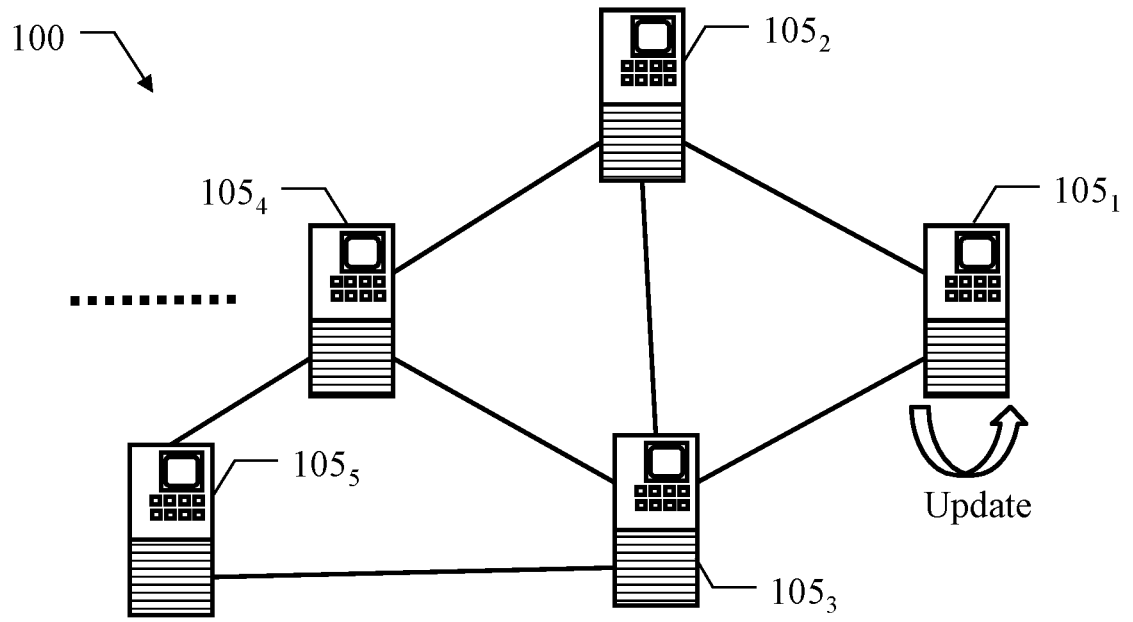

Moving to FIG. 1B, in response to the request, the security information of the (first) computing machine 105$_1$ is updated accordingly (for example, by changing its password); a new version of the security information is then stored into the computing machine 105$_1$ by replacing its old or current version.

Figure 1C:
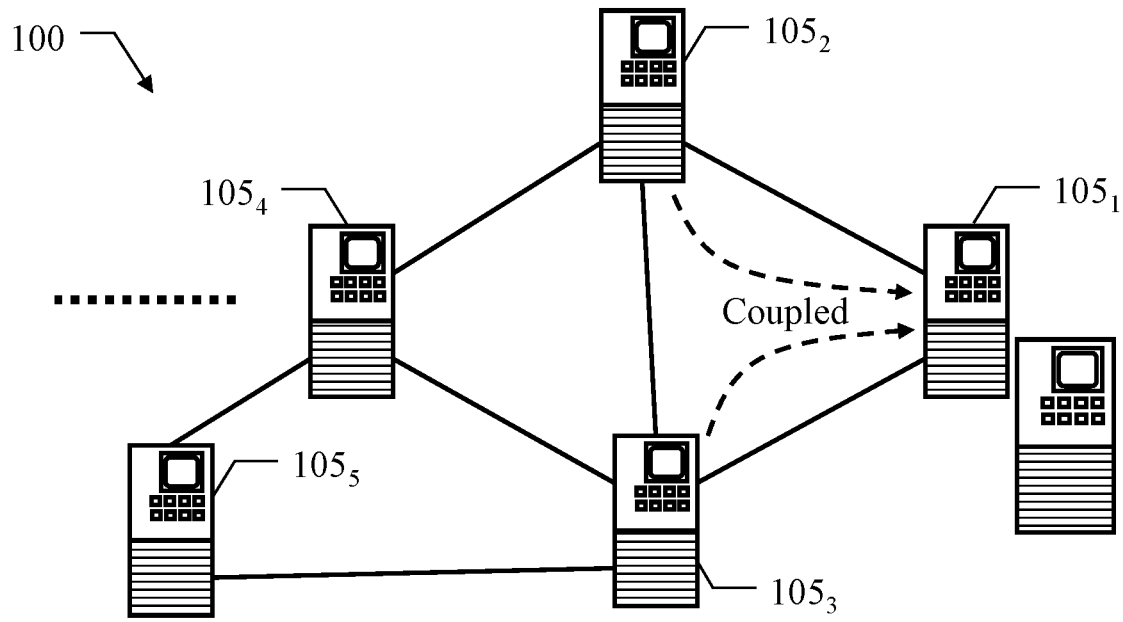

Moving to FIG. 1C, one or more (coupled) computing machines 105$i$ are determined to be coupled with the current computing machine 105$_1$ (for example, the computing machines 105$i$ that most interacted with the current computing machine in a last time period); in this case, the coupled computing machines are 105$_2$ and 105$_3$.

Figure 1D:
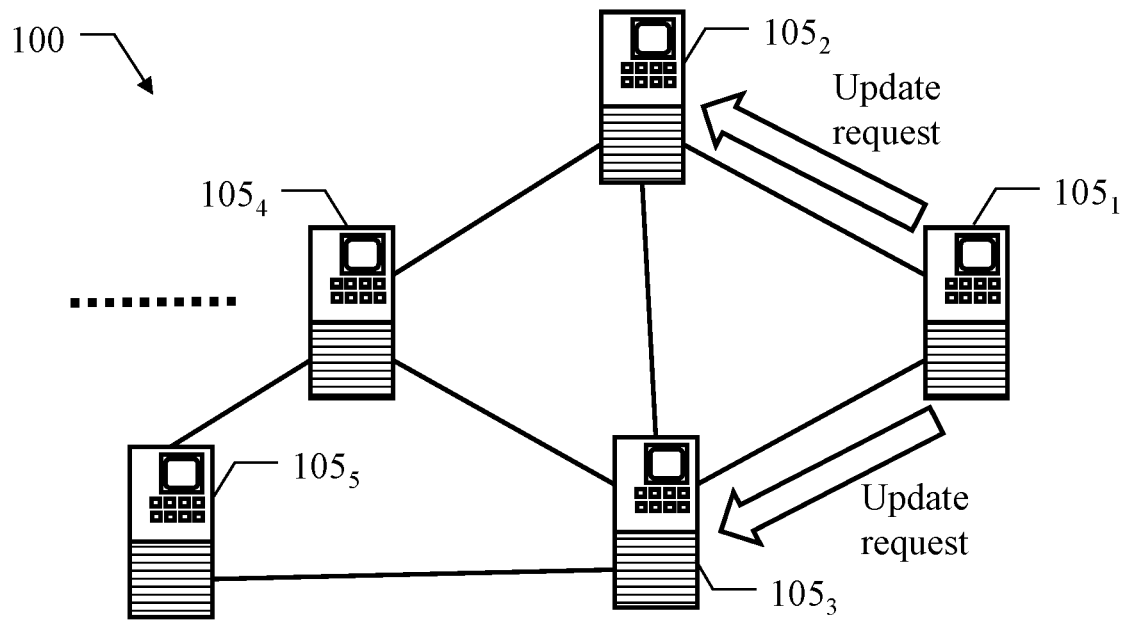

Moving to FIG. 1D, a (further) update request for updating the security information of the coupled computing machines is submitted by the current computing machine 105$_1$ to the coupled computing machines 105$_2$ and 105$_3$.

Each (now current) computing machine 105$i$ receiving an update request performs the same operations as above (for example, with the computing machine 105$_2$ that updates its security information, determines computing machines coupled with it, and then submits the update request to the computing machine 105$_4$, and the computing machine 105$_3$ that updates its security information, determines computing machines coupled with it, and then submits the update request to the computing machine 105$_5$, and so on). The process is reiterated recursively until the security information of all the computing machines 105$i$ has been updated.

The above-described solution may significantly simplify the activities required to keep the security information up-to-date (by leveraging a sort of social approach among the computing machines). Particularly, this reduces (down to completely removes) any manual intervention and then makes the procedure very fast; moreover, this facilitates the timely update of the security information (for example, the change of the passwords before their expiration).

As a result, any downtime of a corresponding service that is provided by the computing system (caused by the time that is required to update the security information) may be significantly reduced.

Moreover, this limits (down to avoiding at all) any risk that the correct execution of corresponding processes may be prevented because of the missing update of the security information (for example, when the expiration of the password of a computing machine may cause the failure of the invocation of a function on this computing machine).

All of the above has a beneficial effect on the security of the computing system; indeed, in this case it is possible to change the security information more frequently (thereby making it more difficult for attackers to acquire the security information illicitly and in any case significantly limiting a time window for any harmful use of the security information that might be acquired illicitly).

Figure 2:
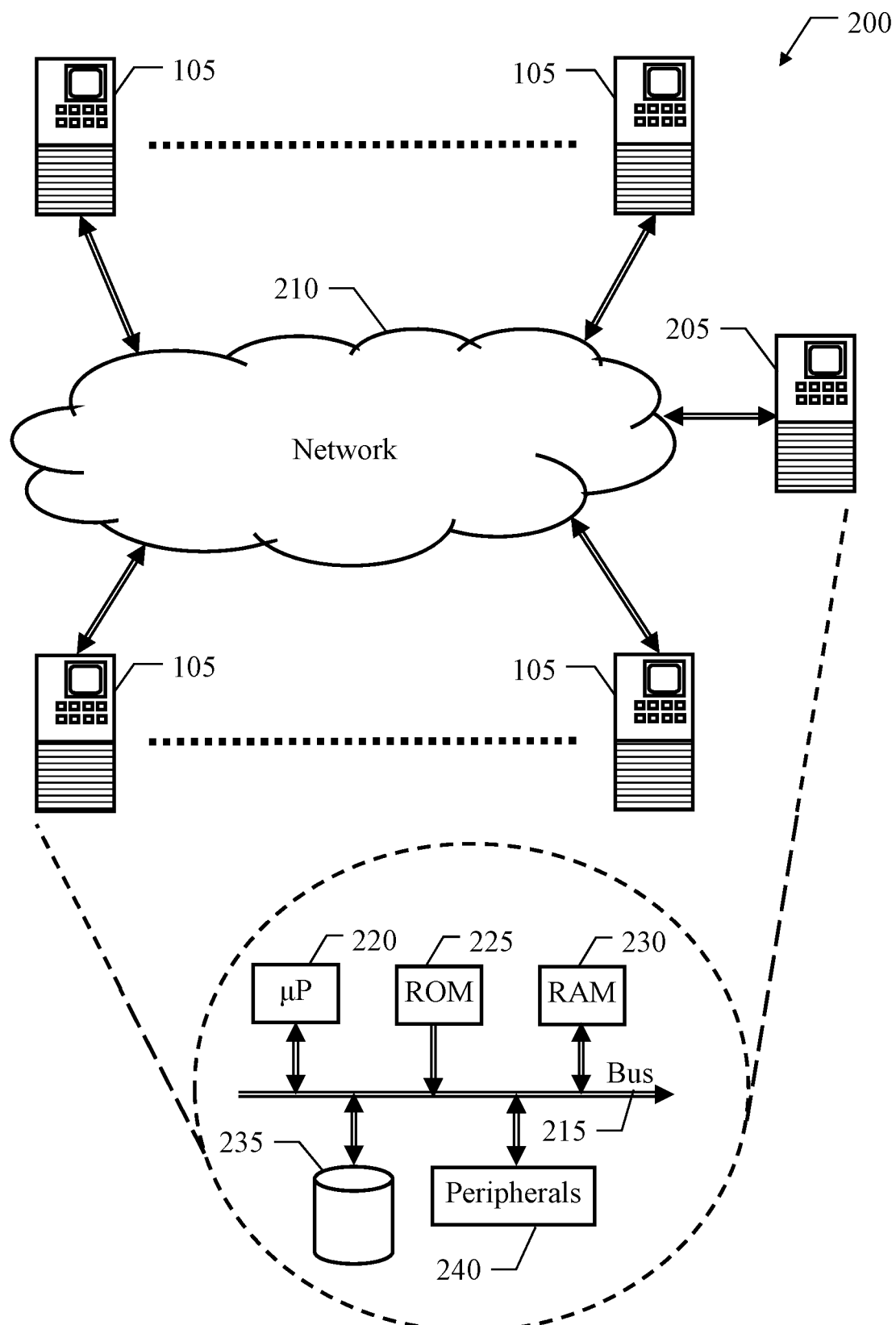
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 comprises the above-mentioned computing machines, generically referred to as operative machines 105; moreover, the computing infrastructure 200 comprises a further computing machine, referred to as service machine 205, which is used to perform service operations on the operative machines 105 (and particularly to update and recover their passwords). The (operative/service) computing machines 105, 205 are connected via any known type of a (telecommunication) network 210 (for example, a LAN) for communicating among them, wherein they are identified by corresponding (unique) identifiers (for example, their IP addresses).

Each of the computing machines 105, 205 comprises several units that are connected among them through a bus structure 215 with one or more levels. Particularly, one or more microprocessors (μP) 220 control operation of the computing machine 105, 205. A non-volatile memory (ROM) 225 stores basic code for a bootstrap of the computing machine 105, 205 and a volatile memory (RAM) 230 is used as a working memory by the microprocessors 220. The computing machine 105, 205 is provided with a mass-memory 235 for storing programs and data, for example, a hard disk. Moreover, the computing machine 105, 205 comprises a number of controllers for peripherals, or Input/Output (I/O) units, 240; for example, the peripherals 240 comprise a keyboard, a mouse, a monitor, a network adapter (NIC) for connecting to the network 210 and a drive for reading/writing removable storage units (such as optical disks like DVDs).

Figure 3:
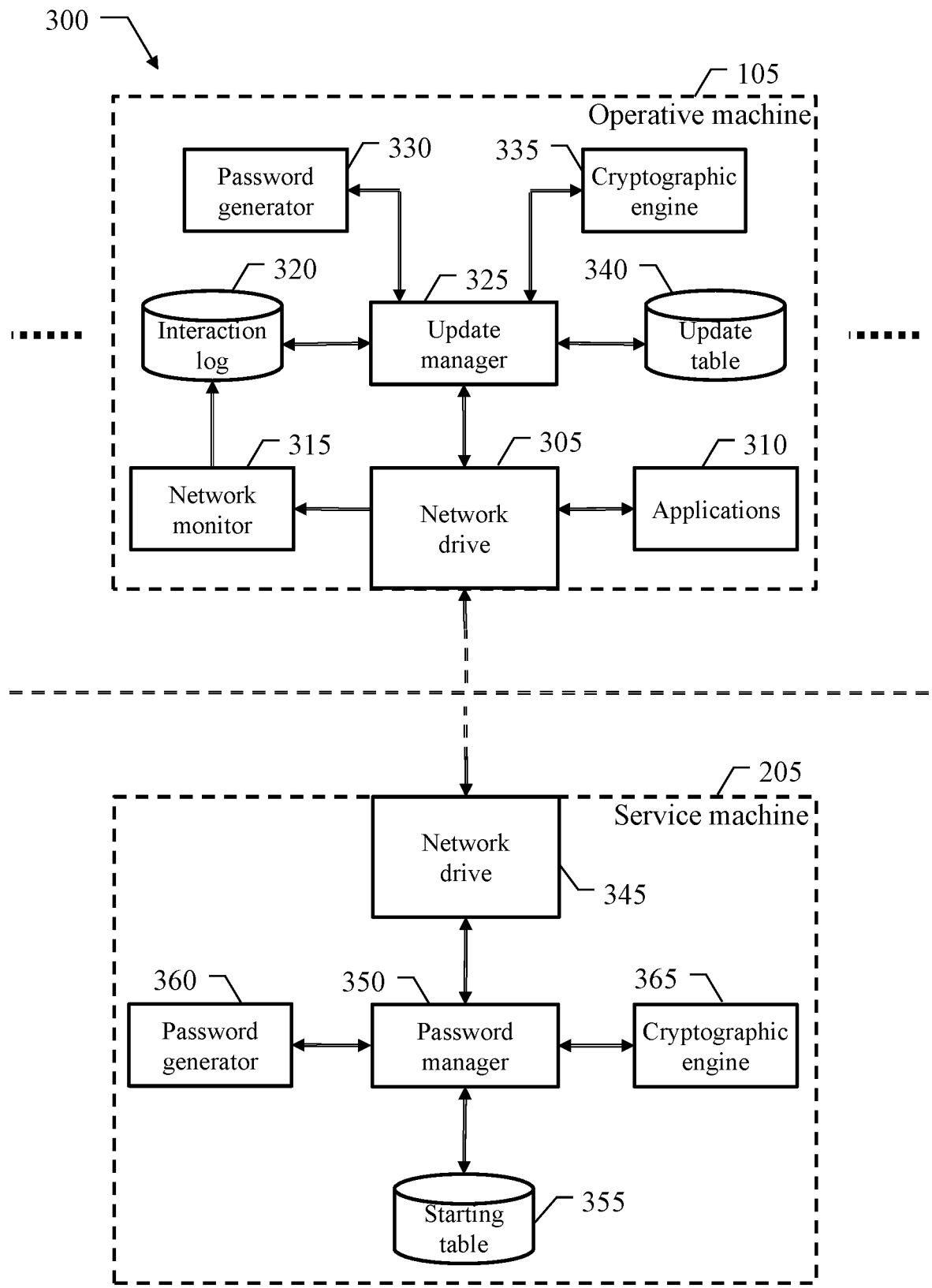
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least in part) into the working memory of each computing machine 105, 205 when the programs are running, together with corresponding operating systems and possible other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from each operative machine 105 (only one shown in the figure), it comprises the following software components.

A network drive 305 is used to communicate over the network. One or more software applications 310 implement corresponding functionalities of the operative machine 105 (for example, processes required by the service provided by the computing system). A network monitor 315 monitors any (interaction) activities over the network indicative of an interaction of the operative machine 105 with the other operative machines (for example, by intercepting any application messages that are exchanged among them). For this purpose, both the software applications 310 and the update manager 315 interface with the network drive 305. The network monitor 315 accesses (in write mode) an interaction log 320. The interaction log 320 stores an indication of the interaction activities that have been monitored over a pre-determined time period (such as in the last 1-4 weeks); for example, the network log 320 has an entry for each other operative machine with which the operative machine 105 has interacted, which entry comprises the identifier of the other operative machine and an interaction counter equal to the number of the application messages that have been exchanged with it.

In the example solution, according to an embodiment of the present disclosure, an update manager 325 manages the update of the security information of the operative machine 105, for example, its password. The update manager 325 interfaces with the network drive 305 and it accesses (in read/write mode) the interaction log 320. The update manager 325 exploits a password generator 330, which generates new versions of the password of the operative machine 105 automatically. In a non-deterministic implementation, the password generator 330 operates in a non-deterministic way so that is it not possible to know how the new versions of the password are generated; alternatively, in a deterministic implementation, the password generator 330 operates in a deterministic way wherein the new versions of the password are generated by applying a pre-defined generation rule. The update manager 325 exploits a cryptographic engine 335, which performs cryptographic operations, particularly based on a Public Key Infrastructure (PKI); the cryptographic engine 335 stores a public key of a system administrator (of the whole computing system). The update manager 325 accesses (in read/write mode) an update memory structure, for example, an update table 340. The update table 340 is associated with an update request that is currently pending, for example, via its name. The update table 340 stores (local) information used to manage the passwords of the (current) operative machine 105 and of its coupled operative machines. For example, the update table 340 has a row for the current operative machine 105 and a row for each coupled operative machine (in decreasing order of their levels of coupling with the current operative machine 105). The row of the current operative machine 105 comprises the identifier of an (ancestor) operative machine from which the current operative machine 105 has received the update request that caused it to update its password (null for the first operative machine); moreover, in the non-deterministic implementation the row of the current operative machine 105 also comprises the current version of its password that is encrypted with the public key of the system administrator. The row of each coupled operative machine comprises its identifier; moreover, in the deterministic implementation the row of each coupled operative machine also comprises a child indicator that is asserted when the current operative machine is the ancestor operative machine of the coupled operative machine, which is then a child operative machine thereof. Each row (of the current/coupled operative machines) comprises an update indicator of the status of the corresponding password as known to the current operative machine 105; the update indicator is asserted when the password is up-to-date (i.e., it has been changed to a new version compliant with the corresponding update request) or deasserted when the password is not up-to-date (i.e., it is still to an old version non-compliant with the corresponding update request). A possible example of the update table 240 (for a number of coupled operative machines Ncp and then a number of rows Nrw=Ncp+1) is:

| Position | Operative machine | Info | Update indicator |
|---|---|---|---|
| 1 | Current operative machine | Identifier of ancestor operative machine (Encrypted password of current operative machine) | Yes/Not |
| 2 | Identifier of most coupled operative machine | (Child indicator = Yes/Not) | Yes/Not |
| . . . | | | |
| Nrw | Identifier of least coupled operative machine | (Child indicator = Yes/Not) | Yes/Not |

In the non-deterministic implementation, the update table 340 is shared (in read mode) with the service machine 205 (via the network drive 305); however, since the update table 340 only comprises the (encrypted) password of the corresponding operative machine 105, there is not a single shared repository with all the passwords that may create a single point of failure.

Moving to the service machine 205, it comprises the following software components.

A network drive 345 as above is used to communicate over the network. A password manager 350 is used by the system administrator to manage the passwords of all the operative machines 105; particularly, the password manager 350 is used to trigger the update of the passwords and to recover their current versions. For this purpose, the password manager 350 interfaces with the network drive 345. The password manager 350 accesses (in read/write mode) a starting memory structure, for example, a starting table 355, which stores information used to update/recover the passwords. For example, the starting table 355 comprises a template that is used as a seed to generate the passwords of all the operative machines 105; the starting table 355 is shared (in read mode) with all the operative machines 105 (via the network drive 345). In the deterministic implementation, the starting table 355 also comprises the identifier of the first operative machine (from which the update of the passwords has started). In the non-deterministic implementation, the password manager 350 exploits a cryptographic engine 355 as above. In the deterministic implementation, instead, the password manager 350 exploits a password generator 360 as above.

Figure 4A:
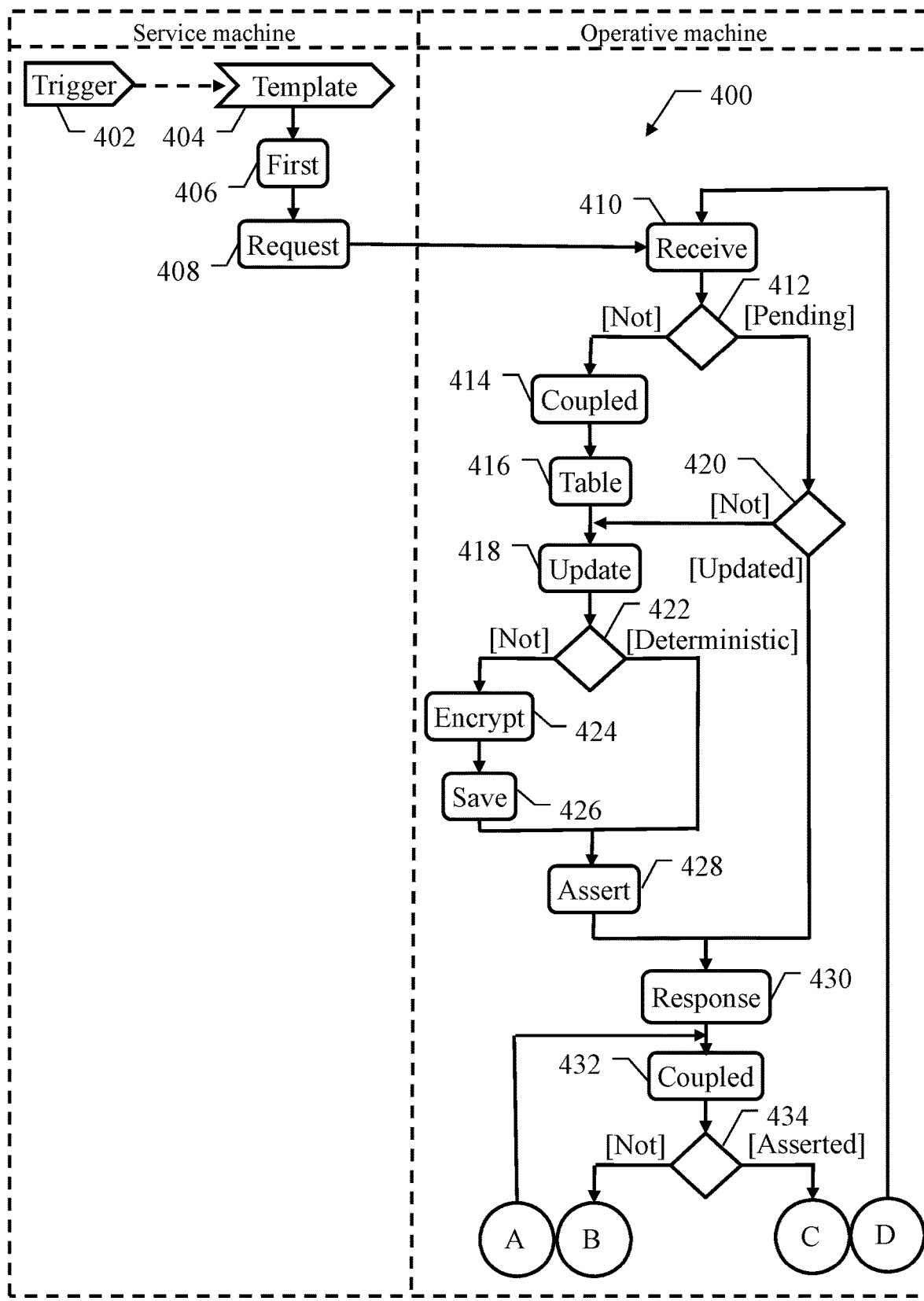
FIG. 4A-FIG. 4B show an activity diagram describing the flow of activities relating to an implementation of the solution according to an embodiment of the present disclosure.
Figure 4B:
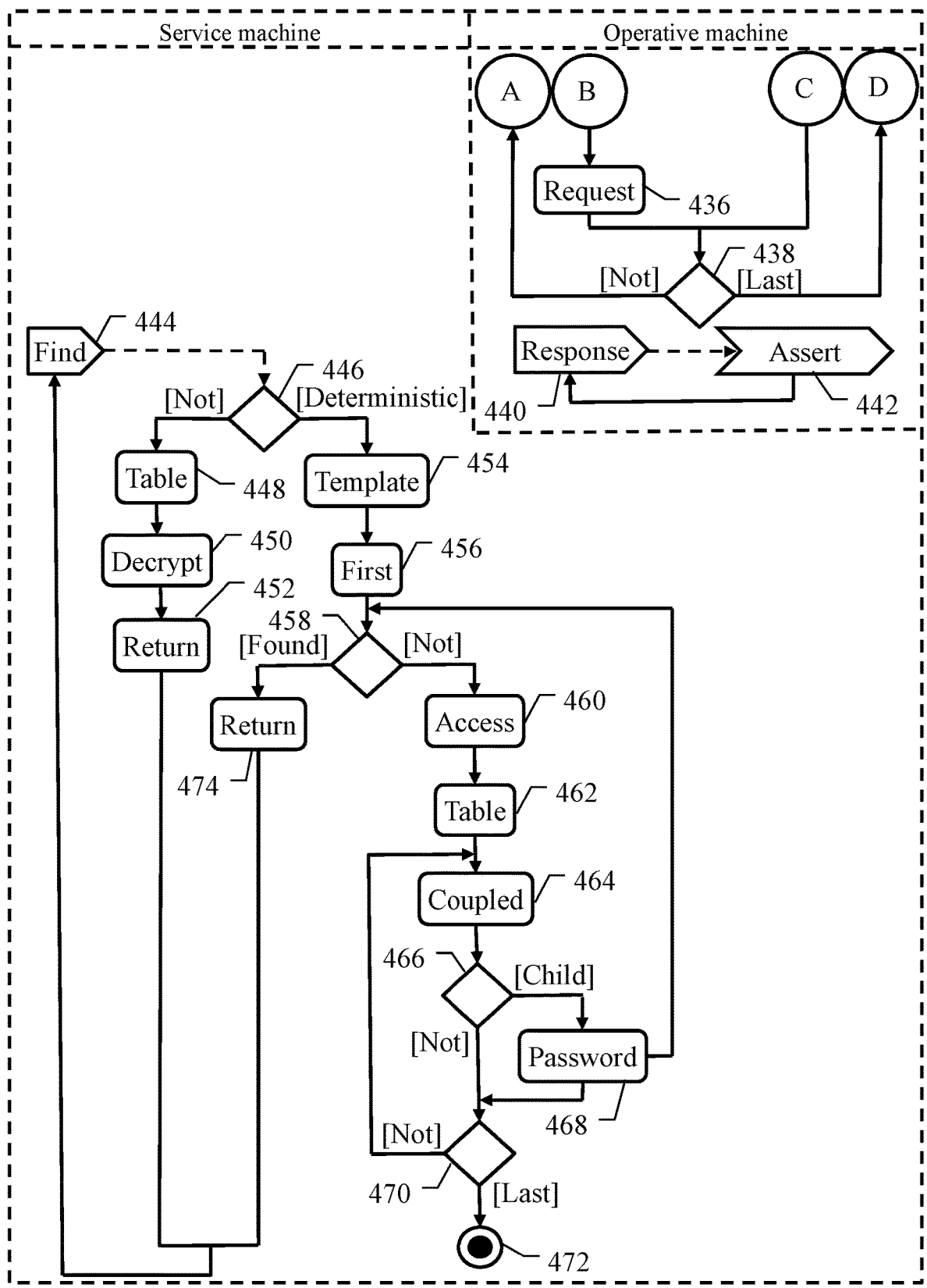

With reference now to FIG. 4A-FIG. 4B, an activity diagram is shown describing the flow of activities relating to an implementation of the solution according to an embodiment of the present disclosure.

Particularly, the activity diagram represents an exemplary process that may be used to manage the passwords of the whole computing system with a method 400. In this respect, each block may correspond to one or more executable instructions for implementing the specified logical function on the corresponding (operative/service) computing machine.

Starting from the swim-lane of the service machine, the process passes from block 402 to block 404 whenever an (update) event triggering an update of the passwords of the operative machines occurs; for example, the update event may be the reaching of a warning time for an expiration of the passwords, such as 1-2 days before it expires (detected automatically by the password manager) or it may be a change of a security policy defining a structure of the passwords, such as its minimum length and type of characters (entered manually by the system administrator via the password manager). In any case, in response to the update event the password manager creates a new version of the starting table (after a back-up of its previous version). The password manager creates the template for the new version of the passwords and saves it into the starting table; for example, the template is generated in a random way in compliance with the security policy. The password manager at block 406 selects the first operative machine (among all the operative machines) for starting the update of the passwords (for example, again in a random way). In the deterministic implementation, the password manager also saves the identifier of the first operative machine into the starting table. The password manager at block 408 submits an update request to the first operative machine (via the network drive). The update request comprises a (unique) identifier thereof; moreover, the update request comprises an indication of the operative machine that submitted it (referred to as requesting machine), for example, set to null in this case to indicate that the requesting machine is the service machine.

Moving to the swim-lane of a generic (current) operative machine, the update manager is in a listening condition at block 410 for any update requests (via the network drive). As soon as the current operative machine receives an update request from any requesting machine, the process descends into block 412. At this point, the flow of activity branches according to a status of the update request. If the update request is not pending (as indicated by the missing of any update table associated with the identifier of the update request), the update manager at block 414 determines the coupled operative machines of the current operative machine. The coupled operative machines are the other operative machines that most interacted with the current operative machine in a time period from a previous update request up to now (as indicated in the interaction log). For example, the coupled operative machines are set to the operative machine having the highest interaction counter and to any other operative machines having the interaction counter (possibly strictly) higher than a percentage thereof (such as 50-70%). In this way, the operative machines are grouped dynamically (in a completely automatic way) according to their execution flows. The update manager at block 416 creates a new version of the update table (by deleting a previous version thereof, if any), with a number of rows Nrw=Ncp+1 for the current operative machine (1) and for the coupled operative machines (Ncp). The update manager copies the indication of the requesting machine (extracted from the update request) into the first row of the update table; therefore, when the current operative machine is the first operative machine that has received the update request from the service machine this value becomes null, whereas otherwise this value becomes the identifier of the ancestor operative machine of the current operative machine. The update manager copies the identifier of the coupled operative machines into the corresponding rows (with index i=2 . . . Nrw), in decreasing order of their interaction counter to have the most coupled operative machine in the second row (i=2) and the least coupled operative machine in the last row (i=Nrw). The update manager deasserts the update indicator in the rows of all the current/coupled operative machines (to indicate that their passwords are not up-to-date); moreover, in the deterministic implementation the update manager deasserts the child indicator in the rows of all the coupled operative machines. At this point, the update manager resets the interaction log by deleting its content (so as to restart the monitoring of the interaction activities of the current operative machine). The process then descends into block 418. Referring back to the block 412, if the update request is pending (as indicated by the presence of an update table associated with the identifier of the update request), the update manager at block 420 verifies the update indicator of the current operative machine (in the first row of the update table). If the update indicator is deasserted (meaning that the password of the current operative machine is not up-to-date), in this case as well the process continues to the block 418.

Considering now the block 418, the update manager generates a new version of the password of the current operative machine. The new version of the password of the current operative machine is generated so as to differ from the one of its ancestor operative machine (if any) increasingly according to their level of coupling. For this purpose, the update manager determines a total number of change steps Nst to be applied to the template for obtaining the new version of the password of the current operative machine. Particularly, the update manager submits a corresponding determination request to the ancestor operative machine, if any (as indicated in the first row of its update table); the same operation is reiterated until the first operative machine is reached (as indicated by the identifier of the ancestor operative machine in the first row of its update table that is null). In response to the determination request, the update manager of the first operative machine initializes the total number of change steps Nst to one (Nst=1). Moreover, if the first operative machine is not the current operative machine, its update manager calculates a partial number of change steps Pst according to its update table, by setting it to the number of rows Nrw minus the index i of the operative machine from which the determination request has been received plus one (Pst=Nrw-i+1); the update manager increments the total number of change steps Nst by the partial number of change steps Pst (Nst=Nst+Pst) and returns it as a response to the determination request. Every other operative machine receives the total number of change steps Nst in the response to the determination request. Moreover, if the operative machine is not the current operative machine, its update manager as above calculates the partial number of change steps Pst according to its update table, increments the total number of change steps Nst by the partial number of change steps Pst and returns it as a response to the determination request. In this way, for each operative machine, the number of change steps Nst of its i-th coupled operative machine differs from the number of change steps Nst of the operative machine by the corresponding partial number of change steps Pst=Nrw-i+1; particularly, for the most coupled operative machine (i=2) this difference is Pst=Nrw-2+1=Nrw-1 and for the least coupled operative machine (i=Nrw) this difference is Pst=Nrw-Nrw+1=1. Therefore, the more coupled the computing machines the more different their total number of change steps Nst. The password generator then generates the new version of the password of the current operative machine by applying its total number of change steps Nst to the template (retrieved from the starting table). Each change step involves a modification of the password (of deterministic or non-deterministic nature according to the type of implementation) in compliance with the security policy defined by the template. For example, the change step is a permutation of two characters or a change of a character that are determined according to a pre-defined generation rule in the deterministic implementation (such as selecting the characters and determining the change according to the values of one or more digits of the identifier of the current operative machine) or that are determined random in the non-deterministic implementation. At the end, the password generator saves the new version of the password as usual by replacing its old version (for example, in hashed form). As a result, the more coupled the computing machines the more different their passwords; moreover, this result is achieved without any sharing of the passwords among the operative machines. All of the above further increases the security of the computing system.

The flow of activity branches at block 422 according to the type of implementation. In case of the non-deterministic implementation, the update manager at block 424 encrypts the new version of the password with the public key of the system administrator. The update manager at block 426 saves the new version of the password so encrypted (encrypted password) into the first row of the update table. The process then descends into block 428; the same point is also reached directly from the block 422 in case of the deterministic implementation. At this point, the update manager asserts the update indicator in the first row of the update table (to indicate that the password of the current operative machine is now up-to-date). The process then descends into block 430; the same point is also reached directly from the block 420 if the update indicator of the current operative machine is asserted (meaning that its password was already up-to-date). If the requesting machine is not the service machine (as indicated in the update request), the update manager further asserts the update indicator of the requesting machine in the corresponding row of the update table (to indicate that its password is up-to-date); moreover, the update manager returns an update response to the requesting machine, which update response comprises the identifier of the ancestor operative machine of the current operative machine (extracted from the first row of the update table).

A loop is now performed for reiterating the same operations recursively on the coupled operative machines. The loop begins at block 432, wherein the update manager takes a coupled operative machine into account (in any arbitrary order). The flow of activity branches at block 434 according to the update indicator of the coupled operative machine (in the corresponding row of the update table). If the update indicator is deasserted (meaning that the password of the coupled operative machine is not up-to-date), the update manager at block 436 submits a (further) update request thereto (via the network drive); the update request comprises the same identifier of the update request that has been received and the identifier of the current operative machine (as indication of the requesting machine), so as to cause the coupled operative machine to process it as above. The flow of activity descends into block 438; the same point is also reached directly from the block 434 if the update indicator of the coupled operative machine is asserted (meaning that its password is already up-to-date). At this point, the update manager verifies whether a last coupled operative machine has been processed. If not, the flow of activity returns to the block 432 to repeat the same operations on a next coupled operative machine. Conversely (once all the coupled operative machines have been processed), the loop is exit by returning to block 410 (waiting for a next update request). In a completely independent way, the process passes from block 440 to block 442 as soon as the update manager receives an update response (via the network drive) from any coupled operative machine to which a corresponding update request has been submitted. Assuming that the update response is positive (to indicate that the password of the coupled operative machine is up-to-date), the update manager accordingly asserts the update indicator of the coupled operative machine in the corresponding row of the update table. Moreover, in the deterministic implementation, if the identifier of the ancestor operative machine of the coupled operative machine (extracted from the update response) indicates the current operative machine, the update manager asserts the child indicator in the row of the coupled operative machine. The process then returns to the block 440 waiting for a next update response.

In a completely independent way, in the swim-lane of the service machine the process passes from block 444 to block 446 as soon as the password manager receives a recovery request for recovering the password of a (current) operative machine (submitted by the system administrator manually after authenticating with the password manager). In response thereto, the flow of activity branches according to the type of implementation. Particularly, in the non-deterministic implementation the blocks 448-452 are executed, whereas in the deterministic implementation the blocks 454-474 are executed; in both cases, the process then returns to the block 444 waiting for a next recovery request.

With reference now to block 448 (non-deterministic implementation), the password manager at block 448 accesses the (shared) update table of the current operative machine and it retrieves the encrypted password of the current operative machine from its first row. The cryptographic engine at block 450 decrypts the encrypted password with the private key of the system administrator (entered manually upon request or retrieved from a secure storage), so as to restore its original form. The password manager at block 452 returns the (decrypted) password of the current operative machine to the system administrator and the process goes back to the block 444. The non-deterministic implementation allows recovering the passwords in a very simple way.

With reference instead to block 454 (deterministic implementation), the password manager retrieves the template from the starting table. The password generator at block 456 re-generates the password of the first operative machine by applying one change step to the template. A loop is now performed for re-generating the passwords of the operative machines recursively. The loop begins at block 458, wherein the password manager verifies whether the password of the current operative machine has been re-generated. If not, the password manager at block 460 accesses a (transit) operative machine with its (re-generated) password, starting from the first operative machine. The password manager at block 462 retrieves the update table of the transit operative machine. An inner loop is now performed for processing the coupled operative machines of the transit operative machine (indicated in its update table). The loop begins at block 464, wherein the password manager takes a coupled operative machine into account (in any arbitrary order). The flow of activity branches at block 466 according to the child indicator of the coupled operative machine (in the corresponding row of the update table). If the child indicator is asserted (meaning that the password of the coupled operative machine has been generated in response to an update request from the transit operative machine), the password manager determines the additional change steps to be applied to the password of the transit operative machine to obtain the password of the coupled operative machine, defined as above by the corresponding partial number of change steps Pst that is calculated according to the update table of the transit operative machine as the number of rows Nrw minus the index i of the coupled operative machine plus one (Pst=Nrw-i+1). The password generator re-generates the password of the coupled operative machine by applying the partial number of change steps Pst to the password of the transit operative machine. The process then returns to the block 458 to execute the same process recursively for the coupled operative machine. At the same time, in the present execution of the process for the transit operative machine, the flow of activity descends from the block 468 into block 470; the same point is also reached directly from the block 466 if the child indicator is asserted (meaning that the password of the coupled operative machine may not be re-generated from the password of the transit operative machine). At this point, the password manager verifies whether a last coupled operative machine has been processed. If not, the flow of activity returns to the block 464 to repeat the same operations on a next coupled operative machine. Conversely (once all the coupled operative machines have been processed), the current execution of the process ends at the concentric white/black stop circles 472. Referring back to the block 458, as soon as the password of the current operative machine has been re-generated, the recursive execution of the process ends by descending into block 474; in this case as well, the password manager returns the (re-generated) password of the current operative machine to the system administrator and the process goes back to the block 444. The deterministic implementation is very safe, since it does not require any storing of the passwords.

The above-described procedure (for both the non-deterministic implementation and the deterministic implementation) allows recovering the passwords of the operative machines easily (when it is necessary), irrespectively of the fact that they have been generated in a completely automatic way.

For example, with reference again to the very simple scenario of FIG. 1A, the first operative machine $105_1$ receives the update request; in response thereto, its update table becomes (wherein PW1 is the password of the operative machine $105_1$ obtained from the template by applying 1 change step, PW1: +1):

TABLE $105_1$

| 1 | $105_1$ | Ancestor: Null ($PW_1$: +1) | Updated |
|---|---|---|---|
| 2 | $105_2$ | (Child: Not) | Not |
| 3 | $105_3$ | (Child: Not) | Not |

The (first) operative machine $105_1$ then submits the update request to the (coupled) operative machines $105_2$ and $105_3$; in response thereto, the update tables become (wherein PW2 and PW3 are the passwords of the operative machines $105_2$ and $105_3$, respectively, obtained from the template by applying 1+(3−2+1)=3 and 1+(3−3+1)=2 change steps, respectively, PW2: +3 and PW3: +2):

TABLE $105_1$

| 1 | $105_1$ | Ancestor: Null ($PW_1$: +1) | Updated |
|---|---|---|---|
| 2 | $105_2$ | (Child: Yes) | Updated |
| 3 | $105_3$ | (Child: Yes) | Updated |

TABLE $105_2$

| 1 | $105_2$ | Ancestor: $105_1$ ($PW_1$: +3) | Updated |
|---|---|---|---|
| 2 | $105_1$ | (Child: Not) | Updated |
| 3 | $105_3$ | (Child: Not) | Not |
| 4 | $105_4$ | (Child: Not) | Not |

TABLE $105_3$

| 1 | $105_3$ | Ancestor: $105_1$ ($PW_1$: +2) | Updated |
|---|---|---|---|
| 2 | $105_1$ | (Child: Not) | Updated |
| 3 | $105_2$ | (Child: Not) | Not |
| 4 | $105_4$ | (Child: Not) | Not |
| 5 | $105_5$ | (Child: Not) | Not |

The operative machine $105_2$ then submits the update request to the (coupled) operative machines $105_3$ and $105_4$; in response thereto, the update tables become (wherein PW4 is the password of the operative machine $105_4$ obtained from the template by applying 3+(4−4+1)=4 change steps, PW4: +4):

TABLE $105_1$

| 1 | $105_1$ | Ancestor: Null ($PW_1$: +1) | Updated |
|---|---|---|---|
| 2 | $105_2$ | (Child: Yes) | Updated |
| 3 | $105_3$ | (Child: Yes) | Updated |

TABLE $105_2$

| 1 | $105_2$ | Ancestor: $105_1$ ($PW_1$: +3) | Updated |
|---|---|---|---|
| 2 | $105_1$ | (Child: Not) | Updated |
| 3 | $105_3$ | (Child: Not) | Updated |
| 4 | $105_4$ | (Child: Yes) | Updated |

TABLE $105_3$

| 1 | $105_3$ | Ancestor: $105_1$ ($PW_1$: +2) | Updated |
|---|---|---|---|
| 2 | $105_1$ | (Child: Not) | Updated |
| 3 | $105_2$ | (Child: Not) | Updated |
| 4 | $105_4$ | (Child: Not) | Not |
| 5 | $105_5$ | (Child: Not) | Not |

TABLE $105_4$

| 1 | $105_4$ | Ancestor: $105_2$ ($PW_1$: +4) | Updated |
|---|---|---|---|
| 2 | $105_2$ | (Child: Not) | Updated |
| 3 | $105_3$ | (Child: Not) | Not |
| 4 | $105_5$ | (Child: Not) | Not |

The operative machine $105_3$ then submits the update request to the (coupled) operative machines $105_4$ and $105_5$; in response thereto, the update tables become (wherein $PW_5$ is the password of the operative machine $105_5$ obtained from the template by applying 2+(5−5+1)=3 change steps, $PW_5$: +3):

TABLE $105_1$

| 1 | $105_1$ | Ancestor: Null ($PW_1$: +1) | Updated |
|---|---|---|---|
| 2 | $105_2$ | (Child: Yes) | Updated |
| 3 | $105_3$ | (Child: Yes) | Updated |

TABLE $105_2$

| 1 | $105_2$ | Ancestor: $105_1$ ($PW_1$: +3) | Updated |
|---|---|---|---|
| 2 | $105_1$ | (Child: Not) | Updated |

TABLE $105_2$-continued

| | | | |
|---|---|---|---|
| 3 | $105_3$ | (Child: Not) | Updated |
| 4 | $105_4$ | (Child: Yes) | Updated |

TABLE $105_3$

| | | | |
|---|---|---|---|
| 1 | $105_3$ | Ancestor: $105_1$ ($PW_1$: +2) | Updated |
| 2 | $105_1$ | (Child: Not) | Updated |
| 3 | $105_2$ | (Child: Not) | Updated |
| 4 | $105_4$ | (Child: Not) | Updated |
| 5 | $105_5$ | (Child: Yes) | Updated |

TABLE $105_4$

| | | | |
|---|---|---|---|
| 1 | $105_4$ | Ancestor: $105_2$ ($PW_1$: +4) | Updated |
| 2 | $105_2$ | (Child: Not) | Updated |
| 3 | $105_3$ | (Child: Not) | Updated |
| 4 | $105_5$ | (Child: Not) | Not |

TABLE $105_5$

| | | | |
|---|---|---|---|
| 1 | $105_5$ | Ancestor: $105_3$ ($PW_1$: +3) | Updated |
| 2 | $105_2$ | (Child: Not) | Updated |
| 3 | $105_4$ | (Child: Not) | Not |

At the end, the operative machine $105_4$ submits the update request to the operative machine $105_5$; in response thereto, the update tables become:

TABLE $105_1$

| | | | |
|---|---|---|---|
| 1 | $105_1$ | Ancestor: Null ($PW_1$: +1) | Updated |
| 2 | $105_2$ | (Child: Yes) | Updated |
| 3 | $105_3$ | (Child: Yes) | Updated |

TABLE $105_2$

| | | | |
|---|---|---|---|
| 1 | $105_2$ | Ancestor: $105_1$ ($PW_1$: +3) | Updated |
| 2 | $105_1$ | (Child: Not) | Updated |
| 3 | $105_3$ | (Child: Not) | Updated |
| 4 | $105_4$ | (Child: Yes) | Updated |

TABLE $105_3$

| | | | |
|---|---|---|---|
| 1 | $105_3$ | Ancestor: $105_1$ ($PW_1$: +2) | Updated |
| 2 | $105_1$ | (Child: Not) | Updated |
| 3 | $105_2$ | (Child: Not) | Updated |
| 4 | $105_4$ | (Child: Not) | Updated |
| 5 | $105_5$ | (Child: Yes) | Updated |

TABLE $105_4$

| | | | |
|---|---|---|---|
| 1 | $105_4$ | Ancestor: $105_2$ ($PW_1$: +4) | Updated |
| 2 | $105_2$ | (Child: Not) | Updated |
| 3 | $105_3$ | (Child: Not) | Updated |
| 4 | $105_5$ | (Child: Not) | Updated |

TABLE $105_5$

| | | | |
|---|---|---|---|
| 1 | $105_5$ | Ancestor: $105_3$ ($PW_1$: +3) | Updated |
| 2 | $105_2$ | (Child: Not) | Updated |
| 3 | $105_4$ | (Child: Not) | Updated |

The actual values of the passwords depend on several contingent factors. Indeed, the passwords change according to the level of coupling among the operative machines. For example, should the operative machine $105_4$ be the most coupled with the operative machine $105_2$ (i=2 instead of i=4 in the update table of the operative machine $105_2$), the password of the operative machine $105_4$ would be obtained from the template by applying 3+(4−2+1)=6 change steps (instead of 4 change steps). Moreover, the passwords change according to a corresponding submission chain of the update requests (depending on the first operative machine to which the service machine submits the update request and on the order with which the operative machines submit the update requests to their coupled operative machines). For example, should the password of the operative machine $105_4$ be generated in response to the update request received directly from the service machine (instead of through the operative machines $105_1$ and $105_2$), the password of the operative machine $105_4$ would be obtained from the template by applying 1 change step (instead of 4 change steps). All of the above further increases the security of the proposed solution.

Whenever any password has to be recovered, in the non-deterministic implementation the (encrypted) password is read from the first row of the corresponding update table and it is then decrypted. In the deterministic implementation, instead, the password is re-generated following the corresponding submission chain of the update requests. For example, should the password of the operative machine $105_4$ be required, the password of the (first) operative machine $105_1$ (as indicated in the starting table) is re-generated by applying one change step (PW1: +1). The operative machine $105_1$ is accessed (with its password PW1) and the password of the (child) operative machine $105_2$ (as indicated in its update table) is re-generated by applying Pcs=3−2+1=2 change steps to the password PW1, for a total of 3 change steps from the template (PW2: +3). The operative machine $105_2$ is accessed (with its password PW2) and the password of the (child) operative machine $105_4$ (as indicated in its update table) is re-generated by applying Pcs=4−4+1=1 change step to the password PW2, for a total of 4 change steps from the template (PW4: +4).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for updating security information in a computing system. However, the security information may be of any type (for example, authentication information for accessing the computing machines, authorization information for authorizing operations, allow/disallow lists for limiting actions and so on) and it may be updated for any reason (for example, any time down to zero before their expiration, at the change of any security policy, in response to a manual request and so on).

In an embodiment, the computing system comprises a plurality of computing machines. However, the computing system may be of any type and it may comprise any number and type of computing machines (see below).

In an embodiment, the method comprises the following steps for each current one of the computing machines.

In an embodiment, the method comprises receiving (by the current computing machine) an update request for updating the security information. However, the update request may be of any type (for example, comprising the identifier of the requesting machine or not when this information is retrieved from a network protocol, with the indication of the requesting machine in the case of the service machine that is null or equal to its identifier, and so on) and it may be received in any way (for example, via a message, a remote command and so on).

In an embodiment, the method comprises updating (by the current computing machine) the corresponding security information from an old version to a new version thereof. However, the security information may be updated in any way (for example, in either a non-deterministic or deterministic way, from any template information, in a complete random way and so on).

In an embodiment, the method comprises determining (by the current computing machine) one or more of the other computing machines that are coupled with the current computing machine. However, the coupled computing machines may be determined in any number (either fixed or variable) and in any way (for example, in any dynamic way, such as according to their level of interaction, invocations and so on, or even in a static way, such as according to their roles, locations and so on).

In an embodiment, the method comprises submitting (by the current computing machine) a further update request to each of the coupled computing machines. However, the further update request may be of any type (for example, differing from the update request, such as for the indication of the requesting machine, or equal to the update request) and it may be submitted in any way (either the same or different with respect to the update request).

In an embodiment, the method comprises determining (by the current computing machine) the coupled computing machines according to an interaction of the current computing machine with each of the other computing machines in a time period. However, the interaction may be of any type (for example, exchanged messages of any type, received remote commands and so on) and relating to any time period (for example, from a previous update request, over a fixed time period, from the turn-on of the current computing machine); moreover, the coupling may be determined in any way according to the interaction (for example, considering the relevant events all in the same way or with decreasing weight according to their age).

In an embodiment, the method comprises storing (by the current computing machine) corresponding update indicators for the current computing machine and for each of the coupled computing machines. However, the update indicators may be stored in any way (for example, together with other information or alone in any memory structure, such as a table, a file and so on).

In an embodiment, each of the update indicators is initialized to an old value indicative of the corresponding security information at the old version. However, the update indicators may be of any type (for example, flags, strings and so on) and they may initialized in any way (for example, asserted/deasserted to any logic values, set to null and so on).

In an embodiment, the method comprises setting (by the current computing machine) the update indicator of the current computing machine to a new value, indicative of the corresponding security information at the new version, in response to said updating the corresponding security information. However, the update indicator may be set in any way (for example, by toggling its logic value, writing a string and so on).

In an embodiment, the method comprises submitting (by the current computing machine) the further update request to each of the coupled computing machines that have the corresponding update indicator at the old value. However, this operation may be performed in any way (for example, directly or after collecting the status of the coupled computing machines).

In an embodiment, the method comprises setting (by the current computing machine) the update indicator of each of the coupled computing machines to the new value in response to the further update request being received from the coupled computing machine and/or in response to a positive result of the further update request being submitted to the coupled computing machine. However, the update indicator of the coupled computing machines may be set in any way (for example, only according to the further update requests received from them, only according to the results of the further update requests submitted to them or according to both of them).

In an embodiment, the method comprises generating (by the current computing machine) the new version of the corresponding security information to differ from the new version of the security information of the other computing machines increasingly according to corresponding levels of coupling therewith. However, the levels of coupling among the computing machines may be defined in any way (for example, in any dynamic way, such as according to their level of interaction, invocations and so on, or even in a static way, such as according to their roles, locations and so on), either locally between each pair of computing machines or globally among all of them.

In an embodiment, the method comprises determining (by the current computing machine) the coupled computing machines that are ordered in a coupling sequence according to the corresponding levels of coupling with the current computing machine. However, the coupling sequence may be of any type (for example, in decreasing or increasing order to the levels of coupling).

In an embodiment, the method comprises generating (by the current computing machine) the new version of the corresponding security information to differ from the new version of the security information of an ancestor one of the computing machines (from which the update request has been received) increasingly according to a coupling distance of the current computing machine from the ancestor computing machine in the coupling sequence of the ancestor computing machine. However, the new version of the security information may be generated according to any coupling distance (for example, defined by the difference of the corresponding indexes in the update table, according to any continuous or discrete difference between any measure of the corresponding level of coupling, and so on) and in any way (for example, according to any linear or non-linear law); moreover, this result may be achieved either indirectly (by generating the security information of all the computing machines in a different way from a common starting point) or directly (by generating the security information of the current computing machine from the security information of the ancestor computing machine).

In an embodiment, the method comprises generating (by the current computing machine) the new version of the corresponding security information from template information. However, the template information may be of any type (for example, a seed, a schema and so on).

In an embodiment, this result is achieved by applying a corresponding number of change steps increasing according to the level of coupling of the computing machine with a first one of the computing machines that has received the update request first. However, the change steps may be of any type (for example, permutations of any number of characters, changes of any type for any number of characters, application of any functions and so on) and their number may be determined in any way (for example, according to any linear or non-linear law based on the coupling distance or more generally on any difference between any measure of the corresponding level of coupling); moreover, the number of change steps with respect to the first computing machine may be determined in any way according to the partial number of change steps between each pair of computing machines along the corresponding submission chain of the update requests (for example, by combining them according to any linear or non-linear law).

In an embodiment, the method comprises generating (by the current computing machine) the new version of the corresponding security information in a non-deterministic way. However, this result may be achieved in any way (for example, in a random way, in a pseudo-random way, in any varying way such as according to the current time, and so on).

In an embodiment, the method comprises encrypting (by the current computing machine) the new version of the corresponding security information into encrypted security information of the current computing machine. However, the security information may be encrypted in any way and into any number of instances of the encrypted security information (for example, with one or more public keys, symmetric keys, PINs and so on).

In an embodiment, the method comprises storing (by the current computing machine) the corresponding encrypted security information into a shared memory structure of the current computing machine. However, the encrypted security information may be stored in any way (for example, together with other information or alone in any memory structure, such as a table, a file and so on); in any case, the possibility of storing the encrypted security information of all the computing machines in a central memory structure is not excluded in a basic implementation.

In an embodiment, the method comprises retrieving (by a further computing machine) the encrypted security information of the current computing machine from the corresponding shared memory structure. However, the further computing machine may be of any type (for example, a dedicated service machine or one or more of the operative machines).

In an embodiment, the method comprises decrypting (by the further computing machine) the encrypted security information of the current computing machine into the new version of the security information of the current computing machine. However, the encrypted security information may be decrypted in any way (according to how it has been encrypted).

In an embodiment, the method comprises encrypting (by the current computing machine) the new version of the corresponding security information with a public key. However, the public key may be of any type (for example, a single public key for all the computing machines or multiple public keys for corresponding groups of the computing machines).

In an embodiment, the method comprises decrypting (by the further computing machine) the encrypted security information of the current computing machine with a private key corresponding to the public key. However, the private key may be of any type (for example, assigned to a system administrator, to project leaders, operators and so on).

In an embodiment, the method comprises generating (by the current computing machine) the new version of the corresponding security information in a deterministic way by applying a pre-defined generation rule. However, the generation rule may be of any type (for example, based in any way on any property of the current operative machine, such as one or more digits of its IP address or hostname, their sum/difference/product and so on, or even fixed).

In an embodiment, the method comprises re-generating (by a further computing machine) the new version of the security information of the current computing machine by applying the generation rule. However, the further computing machine may be of any type (either the same or different with respect to above); moreover, the security information may be re-generated in any way (for example, by applying the generation rule in either the same or different way with respect to the generation of the security information, such as from the template information in one case and from the ancestor computing machine in another case, always from the template information or always from the ancestor computing machine).

In an embodiment, the method comprises re-generating (by the further computing machine) the new version of the security information of the current computing machine by applying the corresponding number of change steps to the template information. However, the number of change steps may be determined and applied in any way (for example, determined and applied incrementally, determined incrementally and applied all together, and so on).

In an embodiment, the method comprises storing (by the current computing machine) an indication of at least part of the coupling sequence. However, the coupling sequence may be stored in any way (for example, indicating the whole coupling sequence of the current computing machine or only the ancestor/child computing machines of the current computing machine, alone or together with other information or alone in any memory structure, such as a table, a file and so on).

In an embodiment, the method comprises re-generating (by the further computing machine) the new version of the security information of the first computing machine from the template information according to the generation rule. However, the security information of the first computing machine may be re-generated in any way according to its generation (for example, by applying any fixed number of change steps or a number of change steps depending on contingent factors, such as the number of its coupled computing machines to be saved in a shared memory structure, its identifier and so on).

In an embodiment, the method comprises an iteration that is implemented by repeating the following steps for each transit one of the computing machines (starting from the first computing machine up to reaching the current computing machine).

In an embodiment, the iteration comprises accessing (by the further computing machine) the coupling sequence of the transit computing machine stored therein with the new version of the corresponding security information. However, the coupling sequence may be accessed in any way (for example, logging-in to the transit computing machine with its security information and then reading the coupling sequence, reading the coupling sequence from a shared memory structure wherein it is stored encrypted with the security information of the transit computing machine and then decrypting it, and so on).

In an embodiment, the iteration comprises re-generating (by the further computing machine) the new version of the security information of each of at least part of the coupled computing machines of the transit computing machine indicated in the corresponding coupling sequence according to the coupling distance of the coupled computing machine from the transit computing machine in the coupling sequence of the transit computing machine. However, this operation may be performed in any way (for example, selectively for the child computing machines only according to any child indicator thereof or indiscriminately for all the coupled computing machines).

In an embodiment, the security information of each of the computing machines is authentication information for accessing the computing machine. However, the authentication information may be of any type (for example, a password, a PIN, a passphrase, a gesture and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing a computing machine to perform the above-described method when the computer program is executed on the computing machine. An embodiment provides a computer program product that comprises a computer readable storage medium having program instructions embodied therewith; the program instructions are executable by a computing machine to cause the computing machine to perform the same method. However, the computer program may be implemented as a stand-alone module, as a plug-in for a pre-existing software program (for example, any access control manager), or even directly in the latter. Moreover, the computer program may be executed on any computing machine (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing each of the steps of the above-described method. An embodiment provides a system comprising a circuit (i.e., any hardware suitably configured, for example, by software) for performing each of the steps of the same method. However, the system may be of any type (for example, formed by a single operative machine or by the whole computing system comprising all the operative machines, with or without the service machine). Each computing machine may be of any type (for example, a physical machine or a virtual machine with any structure and comprising any units, such as cache memories temporarily storing the programs or parts thereof) and the computing system may have any architecture (for example, of any distributed type, such as based on a local area, wide area, global, mobile or satellite network that uses any kind of wired or wireless connections among the computing machines, of any stand-alone type, such as with the computing machines that are virtual machines implemented on a single host machine, or any combination thereof).

Generally, similar considerations apply if the computing machine and the computing system each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of the features of the claims may be the following: claim 2 with claim 1, claim 3 with claim 1 or 2, claim 5 with any claim from 1 to 4, claim 6 with claim 5, claim 7 with claim 6, claim 8 with any claim from 1 to 4, claim 9 with claim 8, claim 10 with claim 9, claim 11 with any claim from 1 to 10, claim 12 with instructions for performing the method of any claim from 1 to 11 and claim 13 with means (or a circuitry) for performing each step of any claim from 1 to 11.

While particular embodiments of the present invention have been shown and described, it will be obvious to those skilled in the art that, based upon the teachings herein, that changes and modifications may be made without departing from this invention and its broader aspects. Therefore, the claims that follow are to encompass within their scope all such changes and modifications as are within the true spirit and scope of this invention, and the invention is solely defined by the claims.

What is claimed is:

1. A method for updating security information in a computing system comprising a plurality of computing machines, each computing machine storing security information corresponding with the respective computing machine, the method comprising:
   receiving, by a current computing machine, an update request for updating security information corresponding with the current computing machine;

updating, by the current computing machine, the security information corresponding with the current computing machine from an old version to a new version;

determining, by the current computing machine, one or more of the other computing machines that are coupled with the current computing machine;

generating, by the current computing machine, the new version of the corresponding security information to differ from the new version of the security information of the other computing machines increasingly according to corresponding levels of coupling therewith;

generating, by the current computing machine, the new version of the corresponding security information from template information by applying a corresponding number of change steps increasing according to the level of coupling of the computing machine with a first one of the computing machines that has received the update request first; and submitting, by the current computing machine, a further update request to each of the coupled computing machines.

2. The method according to claim 1, wherein the determining, by the current computing machine, one or more of the other computing machines that are coupled with the current computing machine comprises:

determining the coupled computing machines according to an interaction of the current computing machine with each of the other computing machines in a time period.

3. The method according to claim 1, wherein the method further comprises:

storing, by the current computing machine, corresponding update indicators for the current computing machine and for each of the coupled computing machines, each of the update indicators being initialized to an old value indicative of the corresponding security information at the old version;

setting, by the current computing machine, the update indicator of the current computing machine to a new value indicative of the corresponding security information at the new version in response to said updating the corresponding security information;

submitting, by the current computing machine, the further update request to each of the coupled computing machines having the corresponding update indicator at the old value; and setting, by the current computing machine, the update indicator of each of the coupled computing machines to the new value in response to the further update request being received from the coupled computing machine or in response to a positive result of the further update request being submitted to the coupled computing machine.

4. The method according to claim 1, wherein the method further comprises:

determining, by the current computing machine, the coupled computing machines being ordered in a coupling sequence according to the corresponding levels of coupling with the current computing machine; and generating, by the current computing machine, the new version of the corresponding security information to differ from the new version of the security information of an ancestor one of the computing machines, from which the update request has been received, increasingly according to a coupling distance of the current computing machine from the ancestor computing machine in the coupling sequence of the ancestor computing machine.

5. The method according to claim 1, wherein the method further comprises:

generating, by the current computing machine, the new version of the corresponding security information in a non-deterministic way.

6. The method according to claim 5, wherein the method further comprises:

encrypting, by the current computing machine, the new version of the corresponding security information into encrypted security information of the current computing machine;

storing, by the current computing machine, the corresponding encrypted security information into a shared memory structure of the current computing machine;

retrieving, by a further computing machine, the encrypted security information of the current computing machine from the corresponding shared memory structure; and decrypting, by the further computing machine, the encrypted security information of the current computing machine into the new version of the security information of the current computing machine.

7. The method according to claim 6, wherein the method further comprises:

encrypting, by the current computing machine, the new version of the corresponding security information with a public key; and decrypting, by the further computing machine, the encrypted security information of the current computing machine with a private key corresponding to the public key.

8. The method according to claim 1, wherein the method further comprises:

generating, by the current computing machine, the new version of the corresponding security information in a deterministic way by applying a pre-defined generation rule; and re-generating, by a further computing machine, the new version of the security information of the current computing machine by applying the generation rule.

9. The method according to claim 8, wherein the method further comprises:

generating, by the current computing machine, the new version of the corresponding security information from template information by applying a corresponding number of change steps increasing according to a level of coupling of the computing machine with a first one of the computing machines that has received the update request first; and re-generating, by the further computing machine, the new version of the security information of the current computing machine by applying the corresponding number of change steps to the template information.

10. The method according to claim 9, wherein the method further comprises:

storing, by the current computing machine, an indication of the coupling sequence; re-generating, by the further computing machine, the new version of the security information of the first computing machine from the template information according to the generation rule; and repeating, for each transit one of the computing machines starting from the first computing machine up to reaching the current computing machine:

accessing, by the further computing machine, the coupling sequence of the transit computing machine stored therein with the new version of the corresponding security information, and re-generating, by the further computing machine, the new version of the security information of each of at least part of the coupled computing machines of the transit computing machine indicated in the corresponding coupling sequence according to the coupling distance of the coupled computing machine from the transit computing machine in the coupling sequence of the transit computing machine.

11. The method according to claim 1, wherein the security information of each of the computing machines is authentication information for accessing the computing machine.

12. A computer program product for updating security information in a computing system comprising a plurality of computing machines, each computing machine storing security information corresponding with the respective computing machine, the computer program product comprising a computer readable storage medium having program instructions embodied therewith, the program instructions executable by one of the computing machines to cause the computing machine to perform a method comprising:

receiving an update request for updating security information corresponding with the current computing machine;

updating the security information corresponding with the current computing machine from an old version to a new version;

determining one or more of the other computing machines that are coupled with the current computing machine;

generating the new version of the corresponding security information to differ from the new version of the security information of the other computing machines increasingly according to corresponding levels of coupling therewith;

generating the new version of the corresponding security information from template information by applying a corresponding number of change steps increasing according to the level of coupling of the computing machine with a first one of the computing machines that has received the update request first; and submitting a further update request to each of the coupled computing machines.

13. A computing machine for updating security information in a computing system comprising a plurality of computing machines, each computing machine storing security information corresponding with the respective computing machine, wherein the computing machine comprises:

a circuit for receiving an update request for updating security information corresponding with the computing machine, wherein the computing machine is a current computing machine;

a circuit for updating the security information corresponding with the current computing machine from an old version to a new version;

a circuit for determining one or more of the other computing machines that are coupled with the current computing machine;

a circuit for generating the new version of the corresponding security information to differ from the new version of the security information of the other computing machines increasingly according to corresponding levels of coupling therewith;

a circuit for generating the new version of the corresponding security information from template information by applying a corresponding number of change steps increasing according to the level of coupling of the computing machine with a first one of the computing machines that has received the update request first; and a circuit for submitting a further update request to each of the coupled computing machines.

* * * * *